United States Patent [19]

Blanding

[11] Patent Number: 4,901,903
[45] Date of Patent: Feb. 20, 1990

[54] WEB GUIDING APPARATUS

[75] Inventor: Douglass L. Blanding, Rochester, N.Y.

[73] Assignee: Eastman Kodak Company, Rochester, N.Y.

[21] Appl. No.: 274,100

[22] Filed: Nov. 21, 1988

Related U.S. Application Data

[63] Continuation-in-part of Ser. No. 900,654, Aug. 26, 1986, Pat. No. 4,795,070.

[51] Int. Cl.$^4$ ............................................. B65H 23/02
[52] U.S. Cl. ...................................... 226/196; 226/21
[58] Field of Search ........................ 226/15, 16, 17, 18, 226/19, 20, 21, 22, 23, 196, 199, 174

[56] References Cited

U.S. PATENT DOCUMENTS

| | | | |
|---|---|---|---|
| 3,547,330 | 12/1970 | Crowe | 226/174 X |
| 3,693,781 | 9/1972 | Homeier | 226/23 X |
| 3,986,650 | 10/1976 | Swanke et al. | 226/21 |
| 4,572,417 | 2/1986 | Joseph et al. | 226/21 X |
| 4,641,770 | 2/1987 | Hediger | 226/21 X |
| 4,685,664 | 8/1987 | Petersdorf | 226/20 X |

Primary Examiner—John M. Jillions
Attorney, Agent, or Firm—James A. Smith

[57] ABSTRACT

Apparatus for guiding a moving web (10) of material in a predetermined travel path (15) relative to a stationary frame (14) is disclosed. A compliant roller (24) is mounted on a pivoted yoke (30) for rolling contact with the web (10) so that as the web moves, the roller (24) finds its natural rolling position on the web. An edge guide (40) is mounted on the roller shaft (26) and is rotatable and axially movable relative to the shaft. An edge guide adjustment mechanism (50) includes a stationary bracket (52) with spaced adjustment stations (58), and a laterally movable control rod (56). The control rod engages the edge guide (40) to determine its lateral position, and selectively locks with the bracket (52,58) to set this lateral position. A light tension spring (22) connects the frame (14) and the yoke (30) to urge the roller (24) and web (10) toward the edge guide (40). Rolling action of the roller, and the light force of the spring together impede aberrant lateral movement of roller and web and provide corrective action should it occur.

6 Claims, 2 Drawing Sheets

WEB GUIDING APPARATUS

CROSS REFERENCE

This is a continuation-in-part of my commonly assigned copending application, Ser. No. 900,654, filed by me jointly with Terry N. Morganti on Aug. 26, 1986, now U.S. Pat. No. 4,795,070.

BACKGROUND OF THE INVENTION

1. Field of the Invention

The present invention relates to a mechanism for guiding a moving web of material, such as paper, in a predetermined path of travel relative to a stationary frame. The invention has specific application as part of a photographic printing apparatus in which images from photographic film are projected and printed on photographic paper moving in a continuous web through the apparatus. It is, however, not limited to that environment.

2. Background Information

In any apparatus in which paper or other web material is fed in a continuous stream, such as from a feed roll, the moving web may have a tendency to wander side to side from its desired path of travel. In a photographic printer, it is essential that the web of photographic print paper be held precisely to its proper path through the various process stations to insure that all process steps are correctly performed and that the resulting print is properly centered.

A typical prior art web guiding apparatus is shown and described in Research Disclosure of March 1980, item #19160 disclosed by J.E. Morse. The Morse publication describes a roller which is pressed against and rolled on the surface of a web which is being pulled over a stationary support or platen. The roller axis is canted or skewed by some small angle relative to the perpendicular to the web path. As the paper moves, in addition to rolling action, there is continual lateral gripping or scuffing action between the soft compliant roller and the moving web due to the angular skew. This continual lateral gripping action forces the web laterally against an edge guide mounted alongside the web path. With respect to such apparatus the skew angle is critical. If the skew angle is too large the gripping action, both continual and macroscopic in magnitude, can be harmful to delicate surfaces such as a photosensitive paper. If the skew angle is too small the desired guiding action is not obtained.

The skew angle must be periodically readjusted in such prior art web guiding apparatus due to the variability of various influences, such as wear and aging of the compliant roller, changes in coefficient of friction and variations in the contact force of the roller.

SUMMARY OF THE INVENTION

In summary, the present invention is an apparatus for guiding a moving web of material in a predetermined travel path relative to a stationary frame. A compliant roller is mounted on a pivoted yoke for rolling contact on the top side, or the under side, of the web so that as the web moves, the roller finds its natural rolling position on the web. An edge guide is mounted on the roller shaft and is rotatable and axially movable relative to the shaft. An edge guide adjustment mechanism includes a stationary bracket with spaced adjustment stations, and a laterally movable control rod. The control rod engages the edge guide to determine its lateral position, and selectively locks with the bracket to set this lateral position. A light tension spring connects the frame and the yoke to urge the roller and web toward the edge guide. Rolling action of the roller, and the light force of the spring together impede aberrant lateral movement of roller and web and provide corrective action should it occur.

DESCRIPTION OF THE PREFERRED EMBODIMENT

Figure 1:
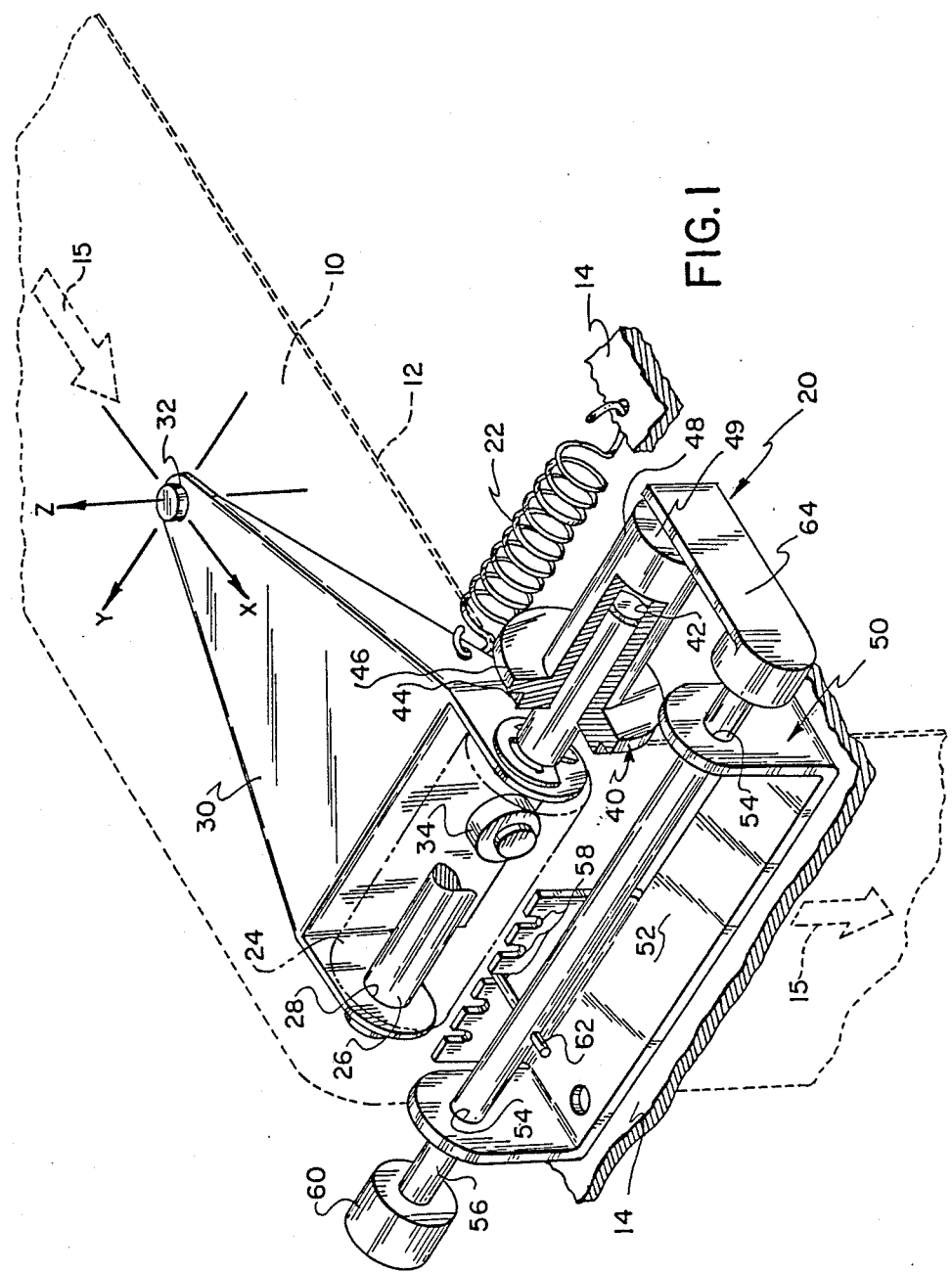
FIG. 1 is a perspective view, as from an elevated forward position, of the web guiding apparatus of this invention.
Figure 2:
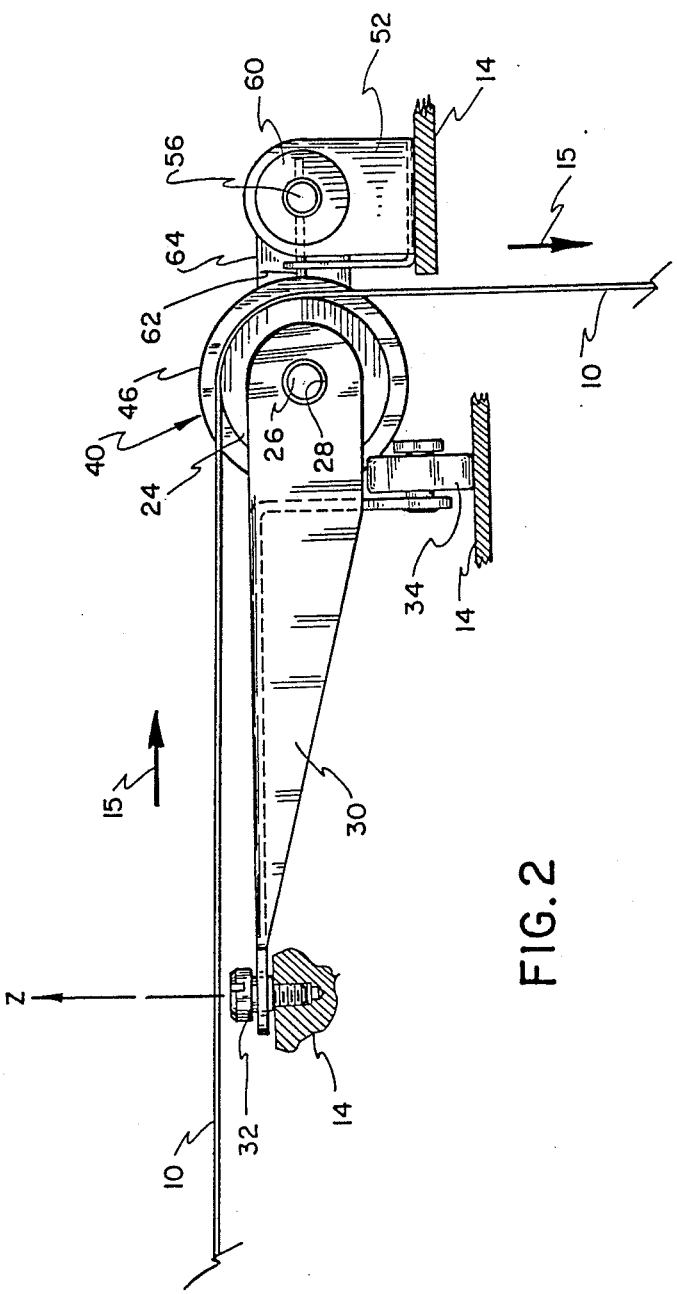
FIG. 2 is a side view of the apparatus, from the left side of FIG. 1.

Referring now to FIGS. 1 and 2, a continuous web of paper 10 having a near edge 12 is moving in the direction of the arrow 15 over a stationary frame, schematically represented at various points at 14. A web guiding mechanism, generally indicated at 20, is mounted on the frame 14 to continually guide the moving web 10 along its desired path of travel, in which the edge 12 of the web moves along and in contact with an edge guide 40. The web 10 is pulled over the guiding mechanism 20, and then downward, by a downstream driving apparatus which is not a part of this invention and is not shown.

The web guiding mechanism 20 includes a yoke 30, an edge guide 40, and an edge guide adjustment mechanism 50. The yoke 30 is pivotally connected at its leading end to a stationary pivot point 32. Mutually perpendicular X, Y, and Z axes are shown intersecting at pivot point 32. The connection of the yoke 30 at the pivot point 32 provides clearance enough to permit the yoke some freedom of rotation or swing about all three of the axes, X, Y, and Z. The Z axis is the vertical caster axis of the mechanism, on which the yoke 30 is permitted rotational displacement in a horizontal plane.

A roller 24 on a roller shaft 26 is rotatably mounted on roller shaft bearings 28 at the trailing end of the yoke 30. Roller 24 is of a rubber or other compliant frictional material. The trailing end of yoke 30 is mounted for horizontal movement about the Z axis on a wheel 34 in rolling contact on the frame 14. A light tension spring 22 connects the yoke 30 to the frame 14, providing a small force continually urging the yoke, about the Z axis, in the direction of the edge guide 40. The spring 22 is never fully retracted. The freedom of swing of the yoke about its Y axis insures the rolling contact of the yoke 30, by means of wheel 34, on the frame 14. The freedom of tilt of the yoke about its X axis insures a uniform distribution of force between roller 24 and web 10 along the length of the roller, and hence a uniform edge-to-edge web tension downstream of the roller 24.

The edge guide 40 includes a central bore 42, a first inner disk portion 44 having an outside diameter substantially equal to that of the roller 24, a second disk portion 46 having an outside diameter larger than that of the roller 24, and an elongated mounting sleeve portion 48 having an outer end 49. The edge guide 40 is both rotatable and axially movable, i.e. slip fit on the right end of the roller shaft 26.

The edge guide adjustment mechanism 50 includes a bracket 52 fixed to the frame 14. The bracket 52 includes rod bearings 54 supporting a control rod 56 for rotation and axial movement relative to the bracket. The bracket 52 further includes a series of axially spaced adjustment notches 58 between the rod bearings 54. The control rod 56 includes a control handle 60 on one end, a radially extending adjustment set pin 62 between the rod bearings 54, and an adjustment arm 64 on the other end. The adjustment arm 64 is adapted for abutting contact with the outer end 49 of the edge guide 40, and thereby determines the extreme rightward lateral position of the edge guide 40.

The lateral position of the edge guide 40 is adjustable, for various widths of web 10, by moving the control rod 56 and its integral adustment arm 64 axially to the right or left relative to the web 10 and the yoke 30. The control rod is rotatable to seat and unseat the adjustment set pin 62 in the adjustment notches 58, which are fixed to the frame 14 of the apparatus.

The system operates to urge the web 10 laterally against the edge guide, as follows. As the web 10 moves along the edge guide and over the roller 24, the roller inherently seeks its normal and stable rolling position on the moving web, in which the roller axis is perpendicular to the travel path of the web, in the same way that a trailer towed by an automobile seeks such a position on the road. This position of the roller 24 corresponds to the desired lateral position of the web 10 against the edge guide 40, and normal rolling action tends to keep the roller in that ideal position. As long as the web 10 moves along the edge guide 40, the roller 24 rotates in this normal position, and the combination of rolling action and spring force impedes aberrant lateral movement of the roller and web. If the web is somehow displaced laterally from the edge guide, the combination of rolling action and spring force subjects the roller and web to an immediate corrective restoring force back toward the guide. The spring 22 is a light tension spring to restrain the roller and web, but not so strong as to pull the roller across the surface of the web.

In the system described, the web is pulled over the yoke and downward around the roller. The system might however be arranged with the web moving under the yoke and pulled upward around the roller.

The terms "upstream" and "downstream" are sometimes used in this specification for convenience. They refer to the direction of travel of the web. Thus, "upstream" and "downstream" are sometimes used in this specification for convenience. They refer to the direction of travel of the web. Thus, "upstream" is the direction from which the web approaches the guiding apparatus, and "downstream" is the direction in which the web leaves the guiding apparatus. Similarly, the terms "leading end" and "trailing end" are used in reference to the guiding apparatus. The "leading end" is upstream and the "trailing end" is downstream "Lateral" means generally side-to-side with respect to the direction of web travel.

The foregoing description of this invention is intended as illustrative. The concept and scope of the invention are limited only by the following claims and equivalents thereof.

What is claimed is:

1. Apparatus for guiding a moving web of material in a predetermined path of travel relative to a stationary frame, including
    a compliant roller mounted on a roller shaft on a supporting yoke for rolling contact with said web, said yoke being pivotally connected to said frame for movement about mutually orthogonal X Y and Z axes;
    an edge guide rotatably mounted on said roller shaft and axially slidable relative thereto, said edge guide including a disk portion having an outside diameter larger than that of said roller; and
    an edge guide adjustment mechanism, including a stationary member and a laterally movable control member, said control member adapted for abutting engagement with said edge guide and for selective locking engagement with said stationary member.

2. Apparatus as defined in claim 1, in which said roller and yoke are under said web, and said web moves over said roller and yoke.

3. Apparatus as defined in claim 1, in which said roller and yoke are over said web, and said web moves under said roller and yoke.

4. Apparatus for guiding a moving web of material in a predetermined path of travel relative to a stationary frame, including
    a compliant roller mounted on a roller shaft on a supporting yoke for rolling contact with said web, said yoke being pivotally connected to said frame upstream of said roller for movement about mutually orthogonal X Y and Z axes;
    an edge guide rotatably mounted on said roller shaft and axially slidable relative thereto, said edge guide including a disk portion having an outside diameter larger than that of said roller;
    an edge guide adjustment mechanism, including a stationary member and a laterally momvable abutment member, said abutment member adapted for selective locking engagement with said stationary member and for abutting engagement with said edge guide to limit the lateral position thereof; and
    means to urge said roller and said web toward said abutment member.

5. Apparatus for guiding a moving web of material in a predetermined path of travel relative to a stationary frame, including:
    a compliant roller mounted on a roller shaft on the trailing end of a supporting yoke for rolling contact with said web, said yoke being pivotally connected at the leading end thereof to said frame for pivotal movement about mutually orthogonal X Y and Z axes;
    an edge guide rotatably mounted on said roller shaft and axially slidable relative thereto, said edge guide including an inner disk portion having an outside diameter not greater than that of said roller and an outer disk portion having an outside diameter larger than that of said roller;
    an edge guide adjustment mechanism, including a stationary bracket with spaced adjustment stations, and a laterally movable abutment member adapted for selective locking engagement with said bracket and for abutting engagement with said edge guide to adjustably limit the extreme lateral position thereof; and
    a tension spring operatively connected to said frame and to said yoke to urge said yoke, said roller and said web toward said frame and said abutment member;
    whereby, as said web moves along said edge guide and over said roller, said roller seeks and tends to hold a stable rolling position on said web, and the combination of rolling action of said roller and tension of said spring impedes aberrant lateral movement of said roller and said web, and subjects said roller and said web to corrective restoring force if aberrant lateral movement should occur.

6. Apparatus as defined in claim 5, in which the trailing end of said yoke is in rolling contact with said frame for horizontal rolling movability on said frame.

* * * * *

UNITED STATES PATENT AND TRADEMARK OFFICE
CERTIFICATE OF CORRECTION

PATENT NO. : 4,901,903
DATED : February 20, 1990
INVENTOR(S) : Douglass L. Blanding It is certified that error appears in the above-identified patent and that said Letters Patent is hereby corrected as shown below:

Column 1, Line 41      "slew" should read --skew--

Column 3, Lines 43-46      delete "Thus, "upstream" and "downstream" are sometimes used in this specification for convenience. They refer to the direction of travel of the web."

Column 4, Line 26      "momvable" should read --movable--

Signed and Sealed this

Ninth Day of April, 1991

Attest:

HARRY F. MANBECK, JR.

Attesting Officer      Commissioner of Patents and Trademarks